US012552170B2

(12) United States Patent
Mikashima

(10) Patent No.: US 12,552,170 B2
(45) Date of Patent: Feb. 17, 2026

(54) IMAGE FORMING APPARATUS

(71) Applicant: KYOCERA Document Solutions Inc., Osaka (JP)

(72) Inventor: Katsuo Mikashima, Osaka (JP)

(73) Assignee: Kyocera Document Solutions, Inc. (JP)

( * ) Notice: Subject to any disclaimer, the term of this patent is extended or adjusted under 35 U.S.C. 154(b) by 180 days.

(21) Appl. No.: 18/614,625

(22) Filed: Mar. 22, 2024

(65) Prior Publication Data

US 2024/0326447 A1 Oct. 3, 2024

(30) Foreign Application Priority Data

Mar. 27, 2023 (JP) ................................. 2023-050091

(51) Int. Cl.

*B41J 2/165* (2006.01)
*B41J 2/045* (2006.01)
*B41J 2/21* (2006.01)
*B41J 29/393* (2006.01)

(52) U.S. Cl.

CPC ....... *B41J 2/16579* (2013.01); *B41J 2/04505* (2013.01); *B41J 2/2142* (2013.01); *B41J 2029/3935* (2013.01)

(58) Field of Classification Search

CPC .... B41J 2/2142; B41J 2/2146; B41J 2/16579; B41J 2/04505; B41J 2029/3935
See application file for complete search history.

(56) References Cited

U.S. PATENT DOCUMENTS

2013/0292899 A1* 11/2013 Mattern ................ B65H 5/062 271/145

FOREIGN PATENT DOCUMENTS

JP 2018-134806 8/2018

* cited by examiner

*Primary Examiner* — Thinh H Nguyen

(57) ABSTRACT

A line sensor includes plural sensor chips and a gap between adjacent two sensor chips. In a test pattern image, a thin line is formed by ink ejected from a nozzle. Further, the line sensor scans the test pattern image on a sheet slanted from a transportation direction of the sheet and generates a test pattern scanned image. An ejection malfunction determination unit determines densities at at least two secondary-scanning-directional positions at a primary-scanning-directional position corresponding to each nozzle in the test pattern scanned image, and determines whether the nozzle is an ejection malfunction nozzle or not on the basis of the determined densities. Here, a slant angle of the sheet is set such that a primary-scanning-directional distance between two positions in the test pattern image corresponding to the two secondary-scanning-directional positions is larger than an arrangement interval of sensor pixels in the sensor chip.

3 Claims, 12 Drawing Sheets

IMAGE FORMING APPARATUS

CROSS-REFERENCE TO RELATED APPLICATIONS

This application relates to and claims priority rights from Japanese Patent Application No. 2023-050091, filed on Mar. 27, 2023, the entire disclosures of which are hereby incorporated by reference herein.

BACKGROUND

1. Field of the Present Disclosure

The present disclosure relates to an image forming apparatus.

2. Description of the Related Art

An inkjet image forming apparatus (a) prints a test pattern using a recording head and (b) scans the printed test pattern using a contact image sensor, and on the basis of the scanned test pattern, detects an ink ejection malfunction nozzle that can not properly eject ink among nozzles that eject ink in the recording head. The test pattern includes plural thin lines that extend along a secondary scanning direction and are arranged along a primary scanning direction, and the ink ejection malfunction nozzle is detected on the basis of pixel values at positions of the thin lines in an image of the test pattern.

A contact image sensor generally includes plural sensor chips that are arranged along a specific direction and have a gap between the chips.

Therefore, in a case that such a contact image sensor is used for scanning a test pattern image, as mentioned, when a sheet on which the test pattern has been printed is transported and passes through a scanning position of the contact image sensor, a thin line in the aforementioned test pattern may not be detected by the contact image sensor and misdetection may occur of an ink ejection malfunction nozzle if the thin line passes through a position of the gap between the sensor chips in the contact image sensor.

SUMMARY

An image forming apparatus according to an aspect of the present disclosure includes an inkjet recording unit, a line sensor, and an ejection malfunction determination unit. The inkjet recording unit is configured to eject ink to a sheet using arranged plural nozzles and perform printing. The line sensor is configured to scan test pattern image on the sheet and generate a test pattern scanned image. The ejection malfunction determination unit is configured to determine whether each nozzle among the plural nozzles is an ejection malfunction nozzle or not on the basis of a density of the test pattern scanned image corresponding to this nozzle. Here, the line sensor includes plural sensor chips and a gap between adjacent two sensor chips among the plural sensor chips. If the nozzle is not an ejection malfunction nozzle, a thin line along a secondary scanning direction in the test pattern image is formed by ink ejected from the nozzle. Further, the line sensor scans the test pattern image on the sheet slanted from a transportation direction of the sheet, and generates the test pattern scanned image; and the ejection malfunction determination unit determines densities at at least two secondary-scanning-directional positions at a primary-scanning-directional position corresponding to each nozzle among the plural nozzles in the test pattern scanned image, and determines whether the nozzle is an ejection malfunction nozzle or not on the basis of the determined densities. Here, a slant angle of the sheet is set such that a primary-scanning-directional distance between two positions in the test pattern image corresponding to the two secondary-scanning-directional positions is larger than an arrangement interval of sensor pixels in the sensor chip.

These and other objects, features and advantages of the present disclosure will become more apparent upon reading of the following detailed description along with the accompanied drawings.

DETAILED DESCRIPTION

Hereinafter, embodiments according to an aspect of the present disclosure will be explained with reference to drawings.

Embodiment 1

Figure 1:
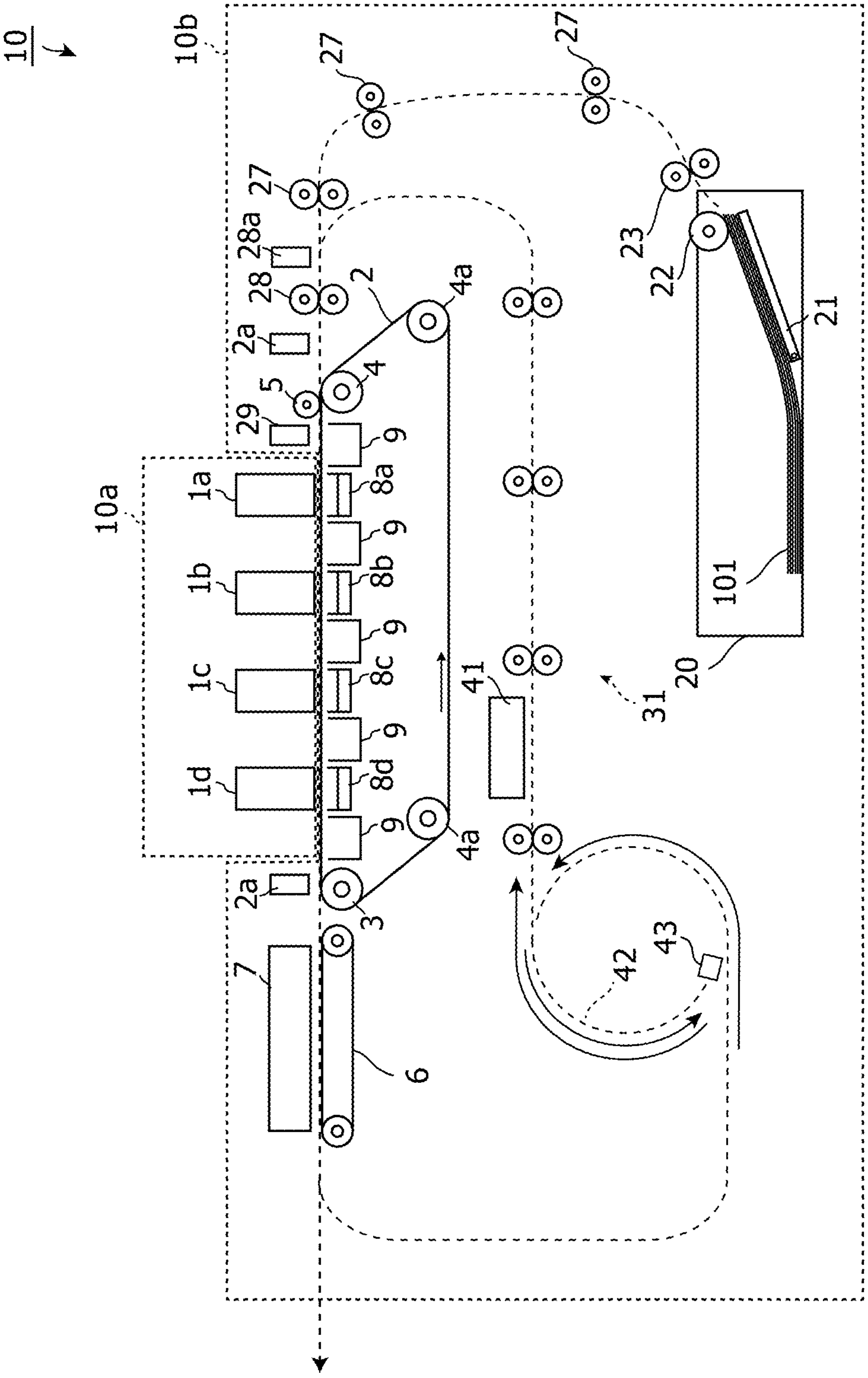
FIG. 1 shows a side view that indicates an internal mechanical configuration of an image forming apparatus in an embodiment according to the present disclosure.

FIG. 1 shows a side view that indicates an internal mechanical configuration of an image forming apparatus in an embodiment according to the present disclosure. The image forming apparatus 10 in this embodiment is an apparatus such as printer, copier, facsimile machine or multi function peripheral, and includes an inkjet color printing mechanism of a line head type in this embodiment.

The image forming apparatus 10 shown in FIG. 1 includes a print engine 10*a* and a sheet transportation unit 10*b*. The print engine 10*a* physically prints an image to be printed on a print sheet (print paper sheet or the like). An ink cartridge is enabled to be mounted and demounted to and from the print engine 10*a*, and the print engine 10*a* performs printing using ink supplied from the ink cartridge. The sheet transportation unit 10*b* transports to the print engine 10*a* the print sheet.

In this embodiment, the print engine 10*a* includes line-head-type inkjet recording units 1*a* to 1*d* corresponding to four ink colors: Cyan, Magenta, Yellow, and Black. Each of the inkjet recording units 1*a* to 1*d* ejects ink using arranged plural nozzles to a print sheet 101 and thereby performs printing.

Further, in this embodiment, the sheet transportation unit 10*b* includes (a) a circular-type transportation belt 2 that is arranged so as to be opposite to the print engine 10*a* and transports a print sheet, (b) a driving roller 3, a driven roller 4, and a tension roller 4*a* around which the transportation belt 2 is hitched, (c) a nipping roller 5 that nips the print sheet with the transportation belt 2, (d) a post-stage transportation belt 6, and (e) a dryer 7.

The driving roller 3, the driven roller 4, and the tension roller 4*a* cause the transportation belt 2 to rotate. The nipping roller 5 nips an incoming print sheet transported from a sheet feeding cassette 20 mentioned below, and the nipped print sheet is transported by the transportation belt 2 to printing positions of the inkjet recording units 1*a* to 1*d* in turn, and on the print sheet, images of respective colors are printed by the inkjet recording units 1*a* to 1*d*. In this situation, the passing print sheet is detected by a sheet sensor 2*a*, and a current position of the print sheet on a transportation path is determined on the basis of a detection timing by a sheet sensor 2*a*, and thereby an image is printed at a proper position on the print sheet. Subsequently, the print sheet after printing is outputted by the post-stage transportation belt 6 to an output tray or the like. In this process, the print sheet on which the ink has been ejected is dried by the dryer 7.

Meanwhile, ink receiver units 8*a* to 8*d* are installed under the head units 11 of the inkjet recording units 1*a* to 1*d*. Flushing (line flushing) of each inkjet recording unit 1*a*, 1*b*, 1*c*, or 1*d* is performed when any flushing opening part is located at a position right under the inkjet recording unit 1*a*, 1*b*, 1*c*, or 1*d* in accordance with a flushing timing signal; and ink is ejected in line from the inkjet recording unit 1*a*, 1*b*, 1*c*, or 1*d* for the flushing, passes through the flushing opening part, is received by the corresponding ink receiver unit 8*a*, 8*b*, 8*c*, or 8*d*, and thereafter is corrected to a waste ink tank. The flushing timing signal is a signal that specifies flushing timings to the inkjet recording units 1*a* to 1*d*, and the control unit 81 generates the flushing timing signal on the basis of a position of the transportation belt 2 determined from a sensor signal generated by a belt sensor 29.

Further, sheet suction units 9 are arranged along the transportation path of the print sheet, in a part (whole part) other than the ink received units 8*a* to 8*d*. A negative pressure is applied to the sheet suction units 9, and thereby the print sheet is adsorbed to the transportation belt 2. It should be noted that a lower negative pressure is applied to the ink receiver units 8*a* to 8*d*, than that applied to the sheet suction units 9.

Further the sheet transportation unit 10*b* includes a sheet feeding cassette 20 as a sheet supply source. The sheet feeding cassette 20 stores print sheets 101, and pushes up the print sheets 101 using a lift plate 21 so as to cause the print sheets 101 to contact with a pickup roller 22. The print sheets 101 put on the sheet feeding cassette 20 are picked up to a sheet feeding roller 23 by the pickup roller 22 sheet by sheet from the upper side. The sheet feeding roller 23 is a roller that transports the print sheets 101 sheet by sheet fed by the pickup roller 22 from the sheet feeding cassette 20 onto a transportation path.

A transportation roller 27 is a roller to transport the print sheet 101 on a predetermined transportation path. A registration roller 28 temporarily stops the print sheet 101 when the incoming print sheet 101 in transportation is detected by a registration roller 28*a*, and transports this print sheet 101 to the print engine 10*a* (specifically, at a nipping position of the nipping roller 5 and the transportation belt 2) at a secondary sheet feeding timing. The secondary sheet feeding timing is specified by a control unit 81 mentioned below such that an image is formed at a position specified on the print sheet 101.

Further, the sheet transportation unit 10*b* includes a circulation sheet transportation unit 31. When performing duplex printing or the like, the circulation sheet transportation unit 31 returns a print sheet from a predetermined position in a downstream side of the print engine 10*a* to a predetermined position in an upstream side of the print engine 10*a*.

As shown in FIG. 1, the circulation sheet transportation unit 31 includes a line sensor 41, a switch back transportation path 42 and a slant setting unit 43.

The line sensor 41 is installed at a predetermined position in a transportation path of the circulation sheet transportation unit 31 (at a position in a downstream side of the switch back transportation path 42) and scans an image of a print sheet 101 that passes through the transportation path.

In particular, in detection operation of an ejection malfunction nozzle, the line sensor 41 scans a test pattern image mentioned below on the print sheet 101 that is transported and passes, and generates a test pattern scanned image.

Figure 2:
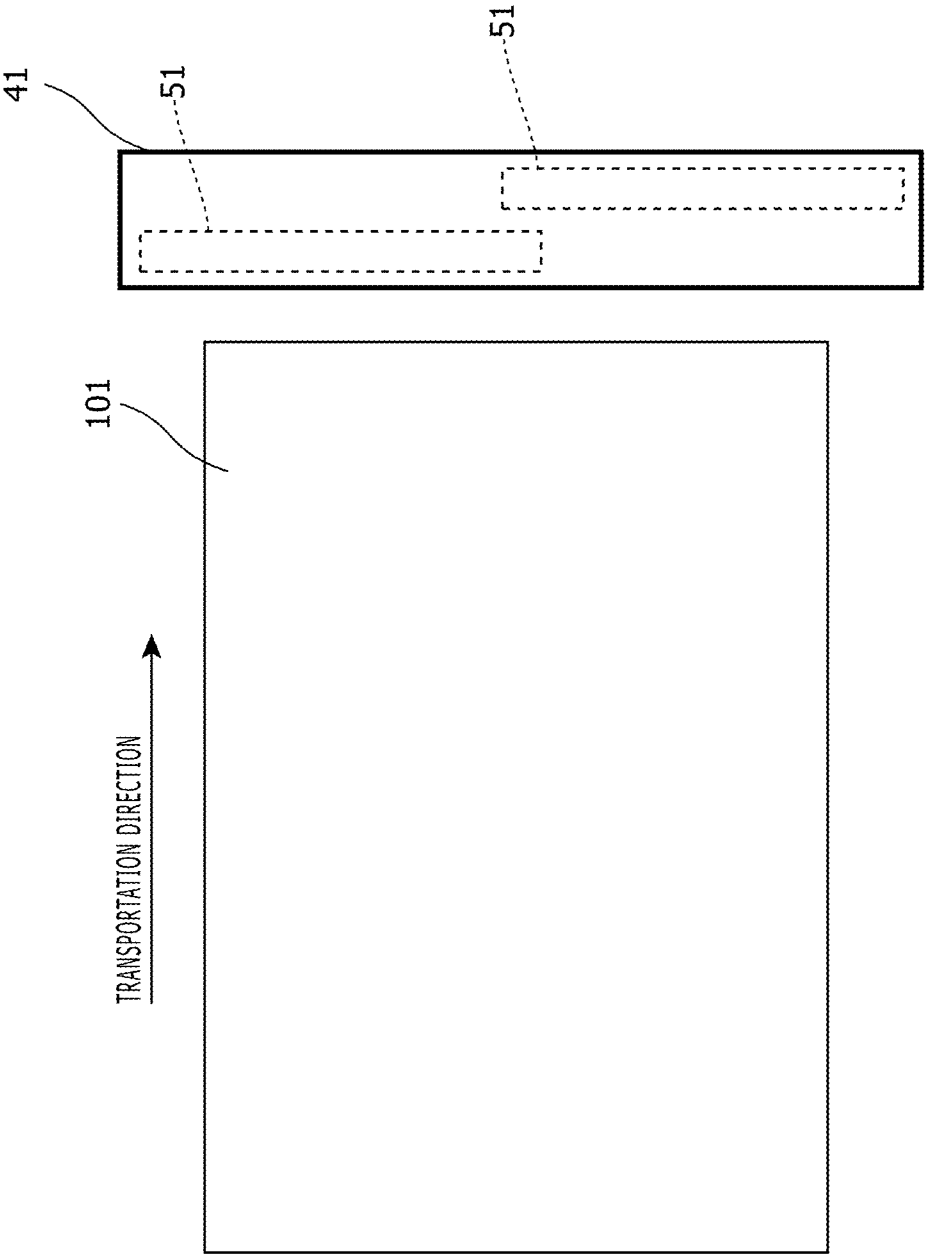
FIG. 2 shows a front view diagram that indicates a line sensor 41 shown in FIG. 1.

FIG. 2 shows a front view diagram that indicates a line sensor 41 shown in FIG. 1. The line sensor 41 includes one or plural CIS (Contact Image Sensor) units 51. The one or plural CIS units 51 is/are arranged along a perpendicular direction to a transportation direction of a print sheet.

Figure 3:
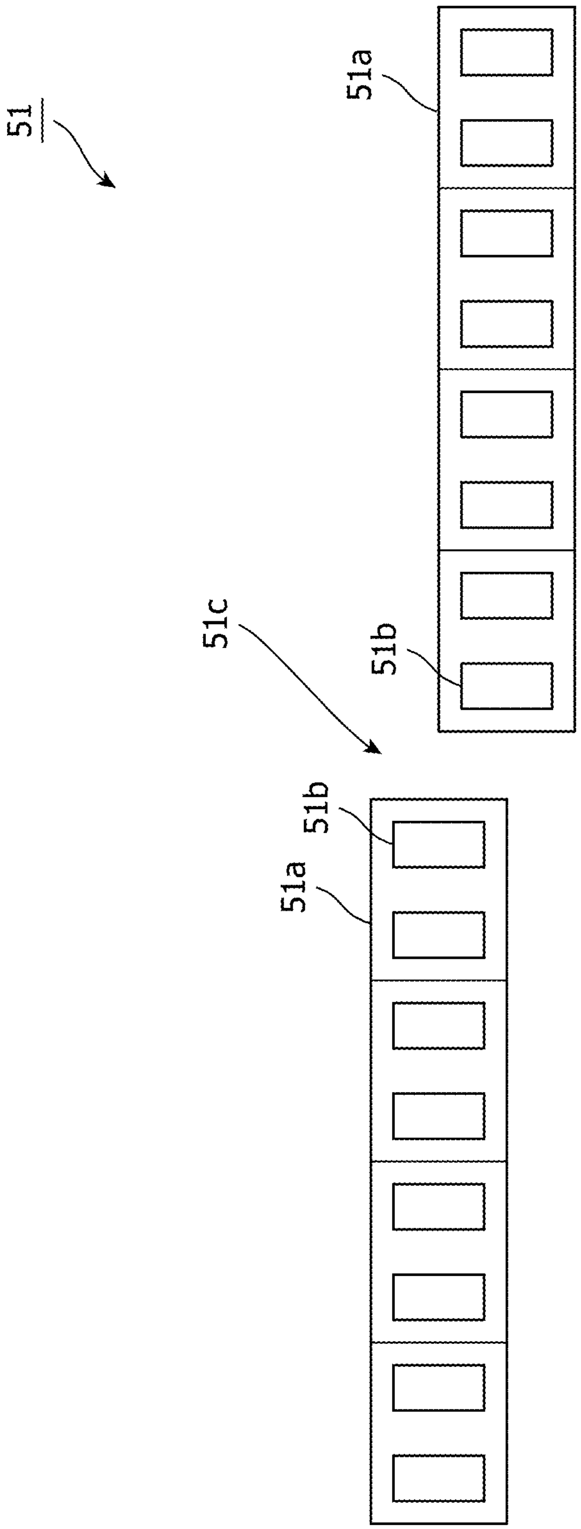
FIG. 3 shows a diagram that indicates an example (a part) of a CIS unit 51 shown in FIG. 2.

FIG. 3 shows a diagram that indicates an example (a part) of a CIS unit 51 shown in FIG. 2. As shown in FIG. 3, each of the CIS units 51 includes plural sensor chips 51*a*. Each of the sensor chips 51*a* includes plural sensor pixels 51*b* (light receiving elements). The sensor pixels 51*b* are arranged with a predetermined physical resolution (e.g. 600 dpi).

As shown in FIG. 3. for example, there is a gap 51*c* between two adjacent sensor chips 51*a* among the plural sensor chips 51*a*. Here, a width of the gap 51*c* is wider than an arrangement interval of the sensor pixels 51*b* and narrower than a double of the arrangement interval of the sensor pixels 51*b*. Further, the gap 51*c* is wider than a width of the aforementioned thin line 121 or 122.

The switch back transportation path 42 reverses a movement direction of the print sheet in order to change a surface that should face the print engine 10*a* from the first surface to the second surface of the print sheet.

The slant setting unit 43 slants the print sheet 101 after printing of the test pattern image with a predetermined slant angle A2 from the transportation direction.

Figure 4:
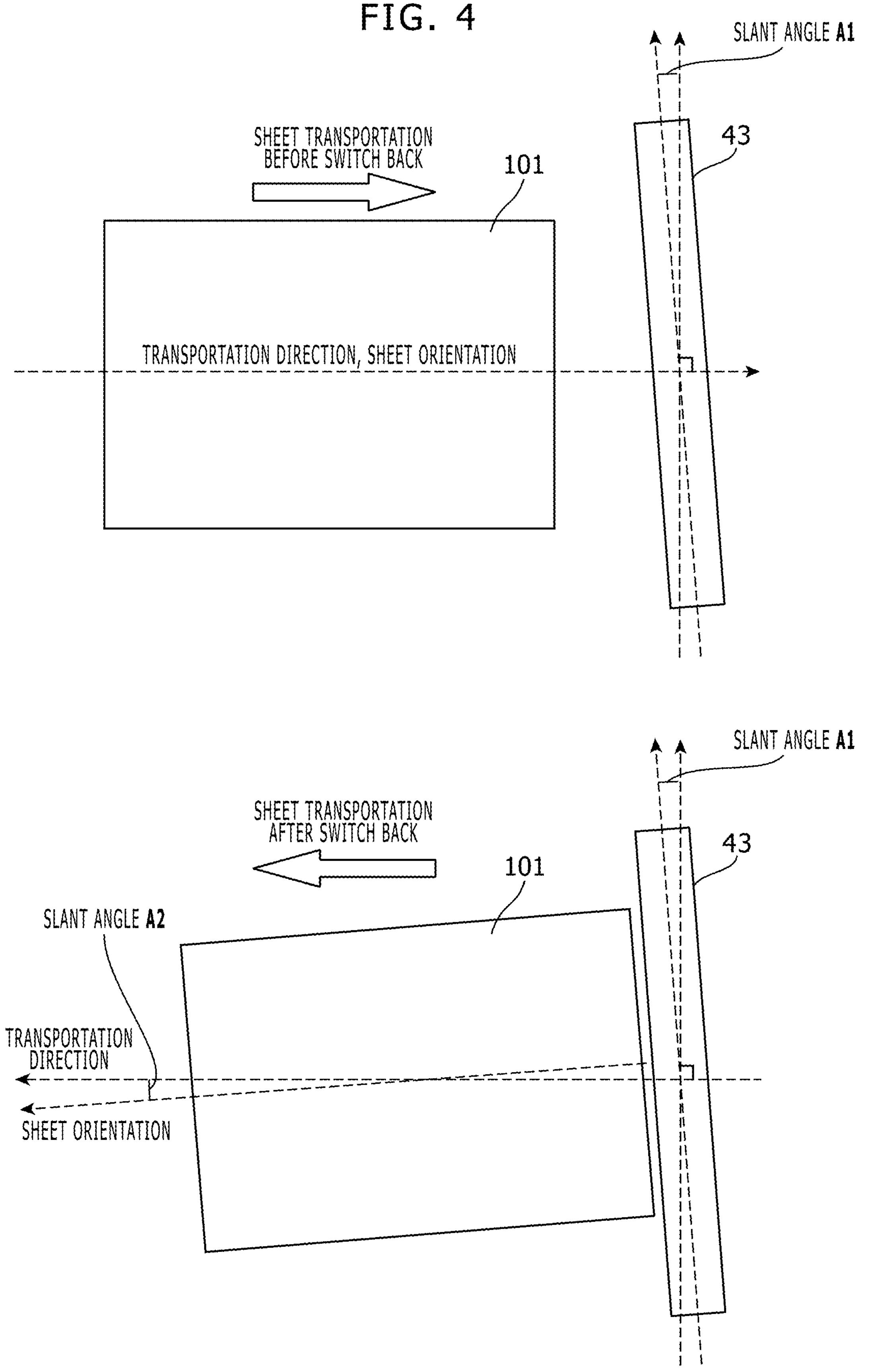
FIG. 4 shows a diagram that explains to give a slant angle to a print sheet 101 by a slant setting unit 43 shown in FIG. 1.

FIG. 4 shows a diagram that explains to give a slant angle to a print sheet 101 by a slant setting unit 43 shown in FIG. 1. Here, as shown in FIG. 1, for example, the slant setting unit 43 is arranged at an end of the switch back transportation path 42, and as shown in FIG. 4, for example, is a member that contacts with a front end of the incoming print sheet 101 at least two positions (here, contact positions in line); and these at least two positions are set along a direction of a predetermined slant angle A1 (A1=A2) to a perpendicular direction to the transportation direction so as to give the aforementioned slant angle A2 to the print sheet 101.

Figure 5:
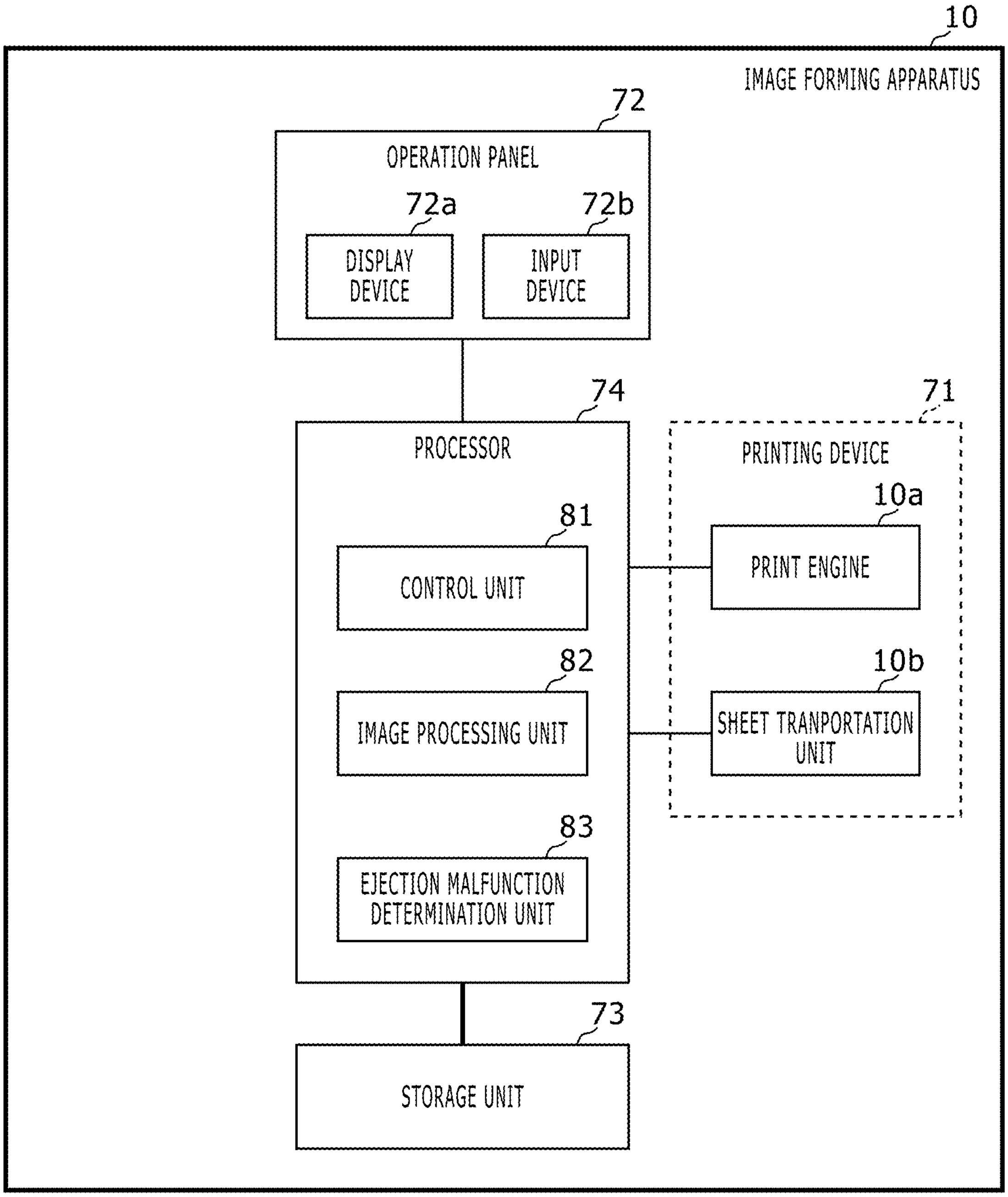
FIG. 5 shows a block diagram that indicates an electronic configuration of the image forming apparatus 10 in the embodiment according to the present disclosure.

FIG. 5 shows a block diagram that indicates an electronic configuration of the image forming apparatus 10 in the embodiment according to the present disclosure. As shown in FIG. 5, the image forming apparatus 10 includes not only a printing device 71 that includes the mechanical configuration shown in FIGS. 1 to 4 but an operation panel 72, a storage device 73 and a processor 74.

The operation panel 72 is arranged on a housing surface of the image forming apparatus 10, and includes a display device 72*a* such as a liquid crystal display and an input device 72*b* such as a hard key and/or a touch panel, and displays sorts of messages for a user using the display device 72*a* and receives a user operation using the input device 72*b*.

The storage device 73 is a non-volatile storage device (flash memory, hard disk drive or the like) in which data, a program and the like have been stored that are required for control of the image forming apparatus 10.

The processor 74 includes a computer that acts in accordance with a program, an ASIC (Application Specific Integrated Circuit) that performs a predetermined action, and/or the like, and acts as sorts of processing units using the computer, the ASIC and/or the like. This computer includes a CPU (Central Processing Unit), a ROM (Read Only Memory), a RAM (Random Access Memory) and the like, and loads a program stored in the storage device 73, the ROM or the like to the RAM and executes the program using the CPU and thereby acts as processing units (with the ASIC if required).

Here the processor 74 acts as a control unit 81, an image processing unit 82, and an ejection malfunction determination unit 83.

The control unit 81 controls the image outputting unit 71 (the print engine 10*a*, the sheet transportation unit 10*b* and the like), and thereby performs a print job requested by a user. In this embodiment, the control unit 81 causes the image processing unit 82 to perform a predetermined image process, and controls the print engine 10*a* and causes it to eject ink and thereby forms a print image on a print sheet. The image processing unit 82 performs a predetermined image process such as RIP (Raster Image Processing), color conversion, halftoning and/or the like for image data of a printing image.

Specifically, the control unit 81 causes the print engine 10*a* to print a user document image based on printing image data specified by a user, and forms a test pattern image on the print sheet 101 in order to detect an ejection malfunction nozzle.

Figure 6:
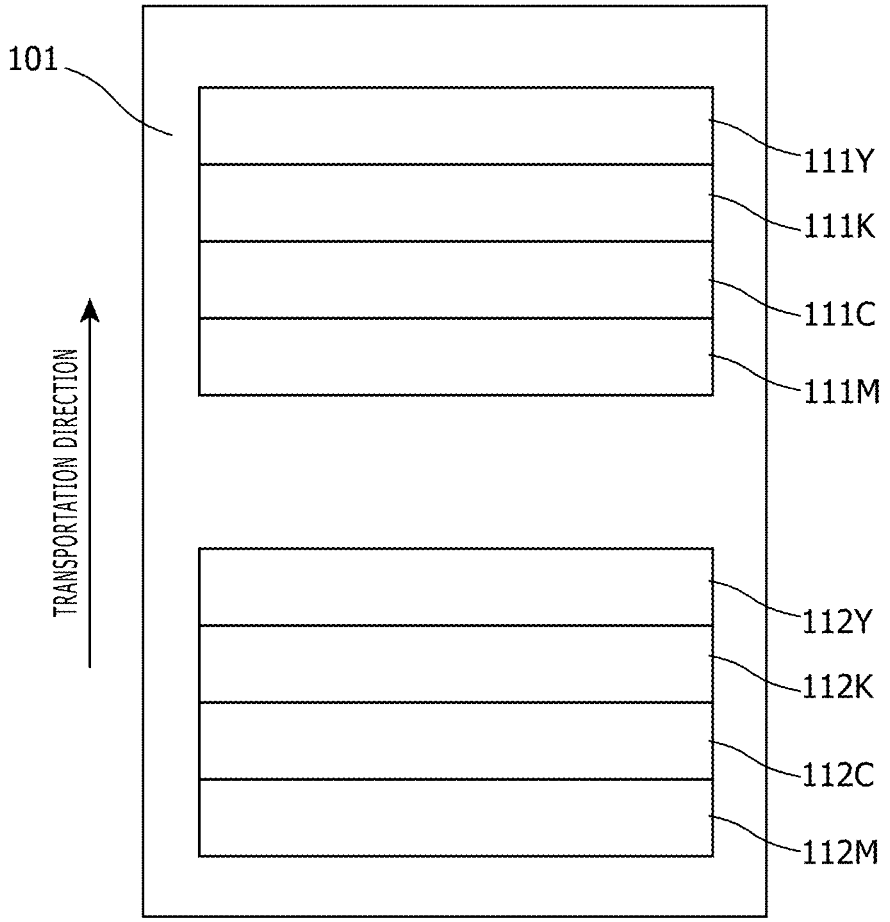
FIG. 6 shows a diagram that indicates an example of a test pattern image in Embodiment 1.

FIG. 6 shows a diagram that indicates an example of a test pattern image in Embodiment 1. In Embodiment 1, as shown in FIG. 6, the test pattern image includes first test pattern images 111Y to 111M and second test pattern images 112Y to 112M arranged along the secondary scanning direction, and the first and the second test patterns are same as each other. The first test pattern image 111Y and the second test pattern image 112Y are test pattern images for the inkjet recording unit 1 of yellow ink color, the first test pattern image 111K and the second test pattern image 112K are test pattern images for the inkjet recording unit 1 of black ink color, the first test pattern image 111C and the second test pattern image 112C are test pattern images for the inkjet recording unit 1 of cyan ink color, and the first test pattern image 111M and the second test pattern image 112M are test pattern images for the inkjet recording unit 1 of magenta ink color.

Figure 7:
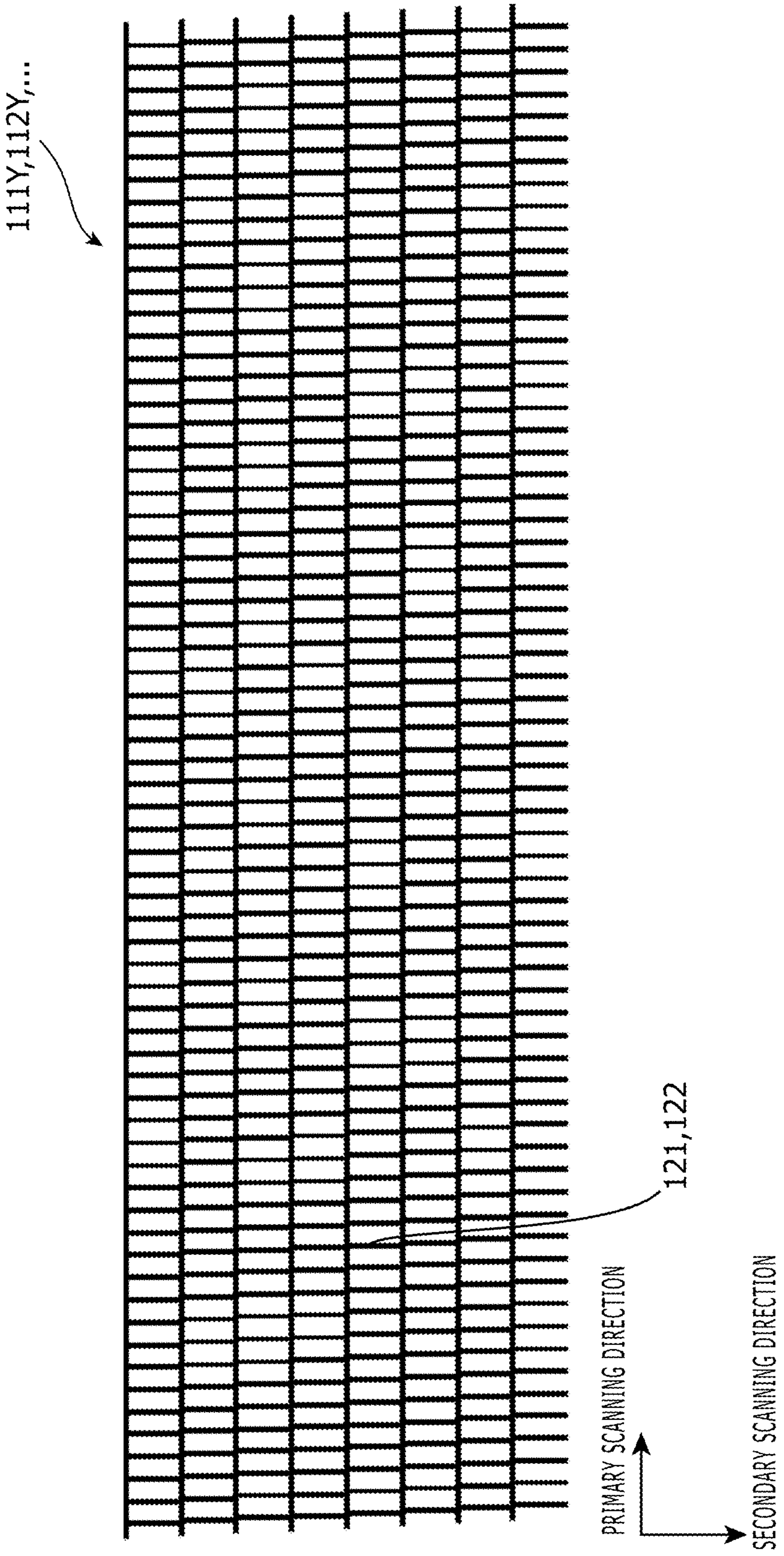
FIG. 7 shows a diagram that indicates an example of one of first test pattern images 111Y to 111M or second test pattern images 112Y to 112M.

FIG. 7 shows a diagram that indicates an example of one of first test pattern images 111Y to 111M or second test pattern images 112Y to 112M.

As shown in FIG. 7, for example, the control unit 81 controls each of the inkjet recording units 1*a* to 1*d* so as to print the first test pattern images 111Y to 111M and the second test pattern images 112Y to 112M, and if there are no ejection malfunction on a nozzle that should eject ink, the first test pattern images 111Y to 111M and the second test pattern images 112Y to 112M are printed without defect.

As shown in FIG. 7, for example, each of the first test pattern images 111Y to 111M and the second test pattern images 112Y to 112M includes a thin line 121 or 122 formed by a single nozzle. It should be noted that as shown in FIG. 7, for example, thin lines formed by adjacent two nozzles are formed so as not to connect with each other in the primary scanning direction (for example, at different positions in the secondary scanning direction), and at one secondary-scanning-directional position, plural thin lines are formed by plural nozzles specified with a predetermined interval in the primary scanning direction.

Thus, if a nozzle that should print the thin lines 121 and 122 is not an ejection malfunction nozzle, then two thin lines 121 and 122 along the secondary scanning direction is formed by ink ejected by this nozzle in the test pattern (here, both of the first and the second test pattern images 111Y to 111M and 112Y to 112M).

The ejection malfunction determination unit 83 controls the line sensor 41 and thereby acquires the test pattern scanned image from the line sensor 41; and for each nozzle among plural nozzles in the inkjet recording unit 1*a*, 1*b*, 1*c* or 1*d* for each ink color, the ejection malfunction determination unit 83 determines densities at at least two secondary-scanning-directional positions at a primary-scanning-directional position corresponding to this nozzle, and determines whether the nozzle is an ejection malfunction nozzle or not (whether the nozzle is a non ejection nozzle or a nozzle of which an ink droplet hitting position is deviated) on the basis of the determined densities.

Here, a relationship between a nozzle and a position in the test pattern scanned image is determined on the basis of a reference pattern, for example. In such a case, a reference pattern of a specific shape is printed with a specific nozzle using the aforementioned test pattern image on the print sheet 101, a position of an image of the reference pattern in the test pattern scanned image is determined, a relationship is determined between this specific nozzle and a position corresponding to this nozzle in the test pattern scanned image, and on the basis of this relationship, a relationship between each residual nozzle and a position corresponding to this nozzle in the test pattern scanned image. Further, the aforementioned density may be an integral value of densities of an image range of the thin line in the rest pattern scanned image.

In Embodiment 1, the aforementioned test pattern scanned image includes a first test pattern scanned image corresponding to the aforementioned first test pattern image and a second test pattern and a second test pattern scanned image corresponding to the aforementioned second test pattern image. One of the aforementioned two secondary-scanning-directional positions is set in a range of a thin line image 121*a* in the first test pattern scanned image corresponding to the thin line 121 in the first test pattern image, and the other of the aforementioned two secondary-scanning-directional positions is set in a range of a thin line image 122*a* in the second test pattern scanned image corresponding to the thin line 122 in the second test pattern image. Further, in Embodiment 1, the ejection malfunction determination unit 83 determines whether the nozzle is an ejection malfunction nozzle or not on the basis of (a) a density of the first test pattern scanned image at the aforementioned primary-scanning-directional position and at one of the secondary-scanning-directional positions (i.e. at a position of a thin line image corresponding to the thin line 121) and (b) a density of the second test pattern scanned image at the aforementioned primary-scanning-directional position and at the other of the secondary-scanning-directional positions (i.e. at a position of a thin line image corresponding to the thin line 122), i.e. determined on the basis of densities at two positions corresponding to the nozzle.

Specifically, if both of the two densities at the aforementioned primary-scanning-directional position and at the two secondary-scanning-directional positions are less than a predetermined threshold value, then it is determined that the nozzle is an ejection malfunction nozzle. Contrarily, if at least one of the two densities is equal to or larger than the predetermined threshold value, then it is determined that the nozzle is not an ejection malfunction nozzle.

Figure 8:
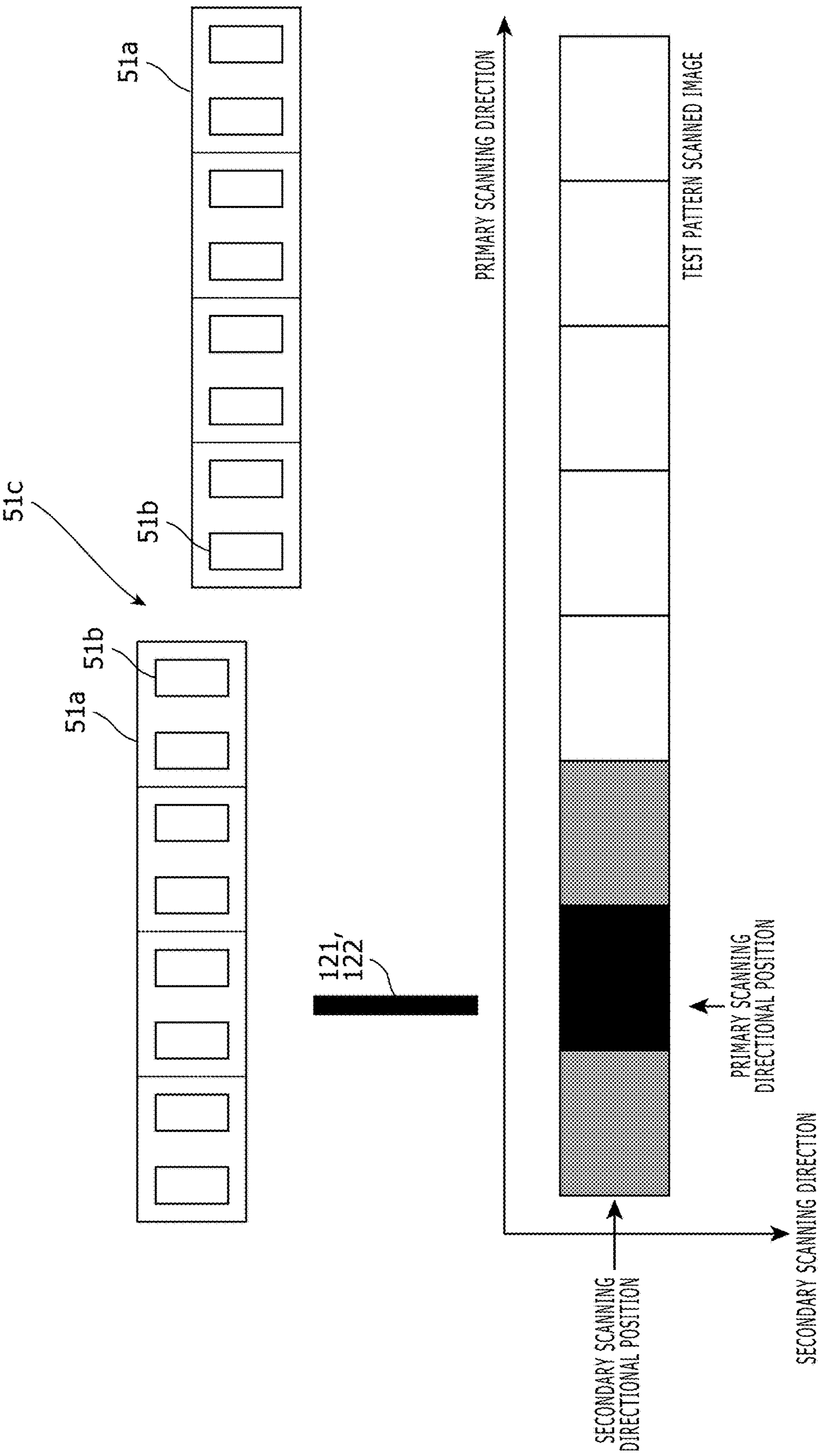
FIG. 8 shows a diagram that explains a density of a test pattern scanned image in a case that a thin line passes through a position other than a gap 51*c* in the line sensor 41.
Figure 9:
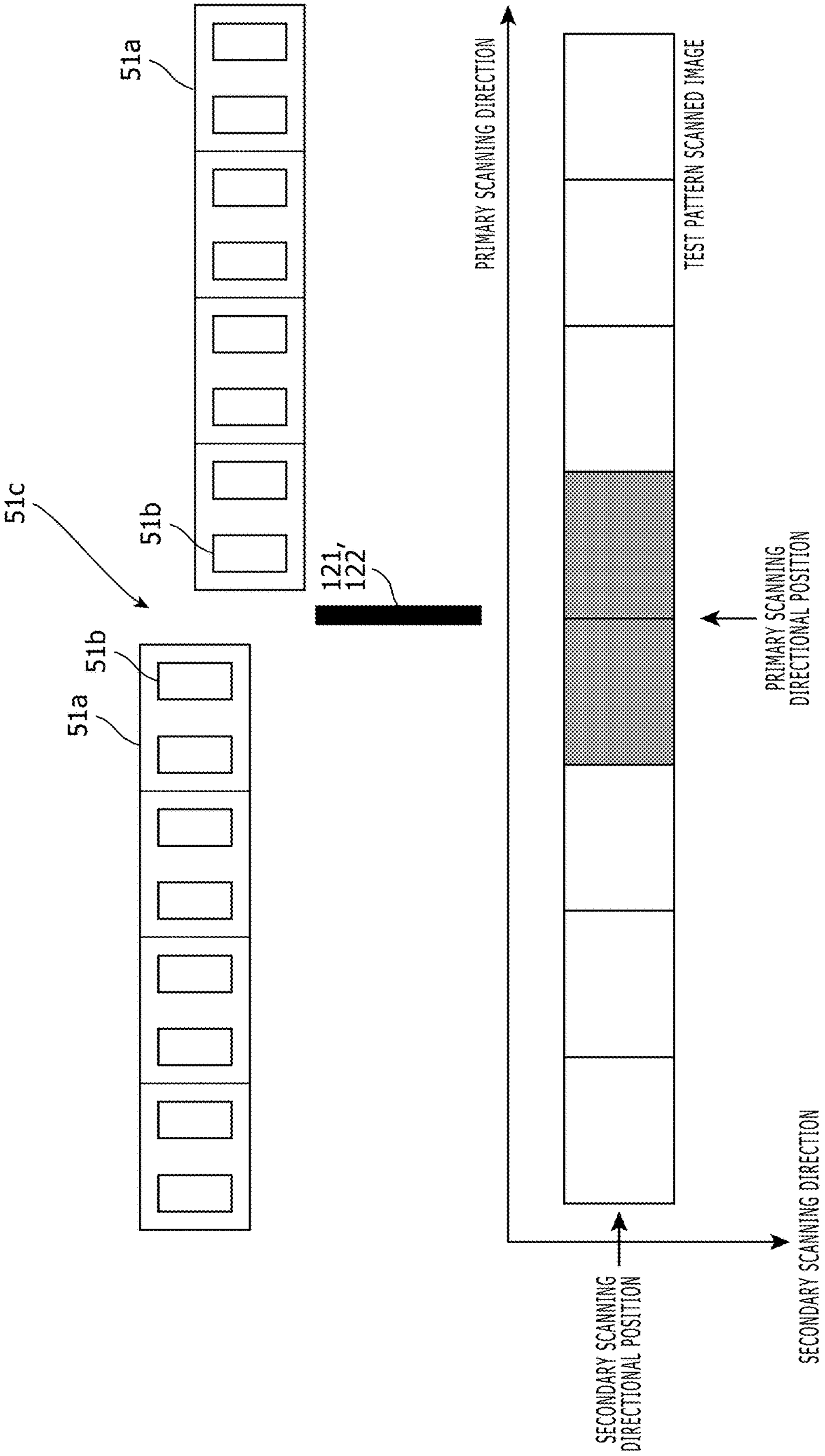
FIG. 9 shows a diagram that explains a density of a test pattern scanned image in a case that a thin line passes through a position of a gap 51*c* in the line sensor 41.

FIG. 8 shows a diagram that explains a density of a test pattern scanned image in a case that a thin line 121 or 122 passes through a position other than a gap 51*c* in the line sensor 41. FIG. 9 shows a diagram that explains a density of a test pattern scanned image in a case that a thin line 121 or 122 passes through a position of a gap 51*c* in the line sensor 41.

If a nozzle as a target of the ejection malfunction determination is not an ejection malfunction nozzle and the thin lines 121 and 122 pass through a position other than the gap 51*c* in the line sensor 41 (i.e. through a position of the sensor chip 51) in a perpendicular direction of the transportation direction (in an arrangement direction of the sensor pixels 51*b*), then as shown in FIG. 8, for example, the thin lines 121 and 122 are properly detected, and therefore, the test pattern scanned image has a high density at the aforementioned primary-scanning-directional position and at the aforementioned secondary-scanning-directional positions and around it.

Contrarily, if a nozzle as a target of the ejection malfunction determination is not an ejection malfunction nozzle and the thin line 121 or 122 passes through a position of the gap 51*c* in the line sensor 41 in a perpendicular direction of the transportation direction, then as shown in FIG. 9, for example, the thin line 121 or 122 is not clearly sensed, and therefore, the test pattern scanned image has a low density at the aforementioned primary-scanning-directional position and at the aforementioned secondary-scanning-directional positions and around it.

Figure 10:
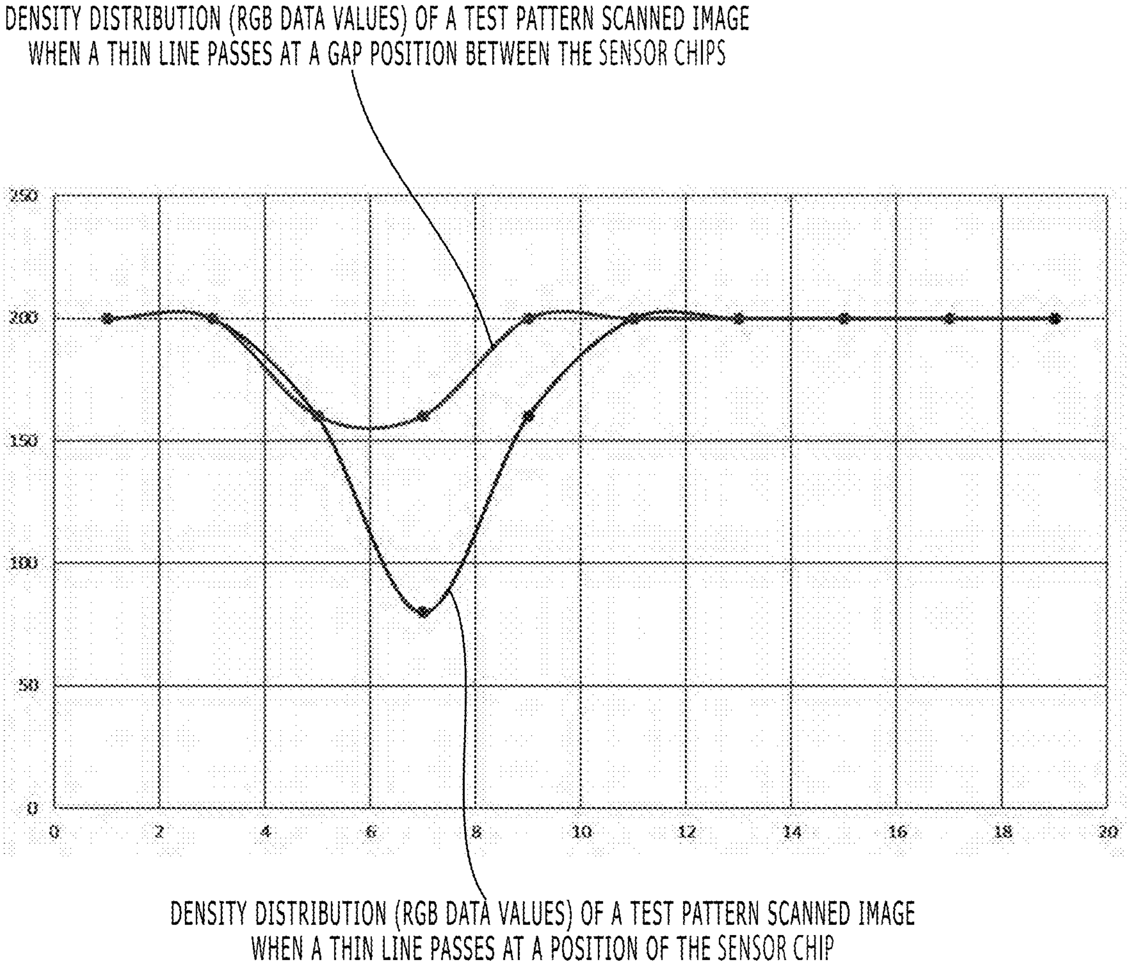
FIG. 10 shows a diagram that explains a density distribution of a test pattern scanned image of which the density distribution changes correspondingly to a passing position of a thin line.
Figure 11:
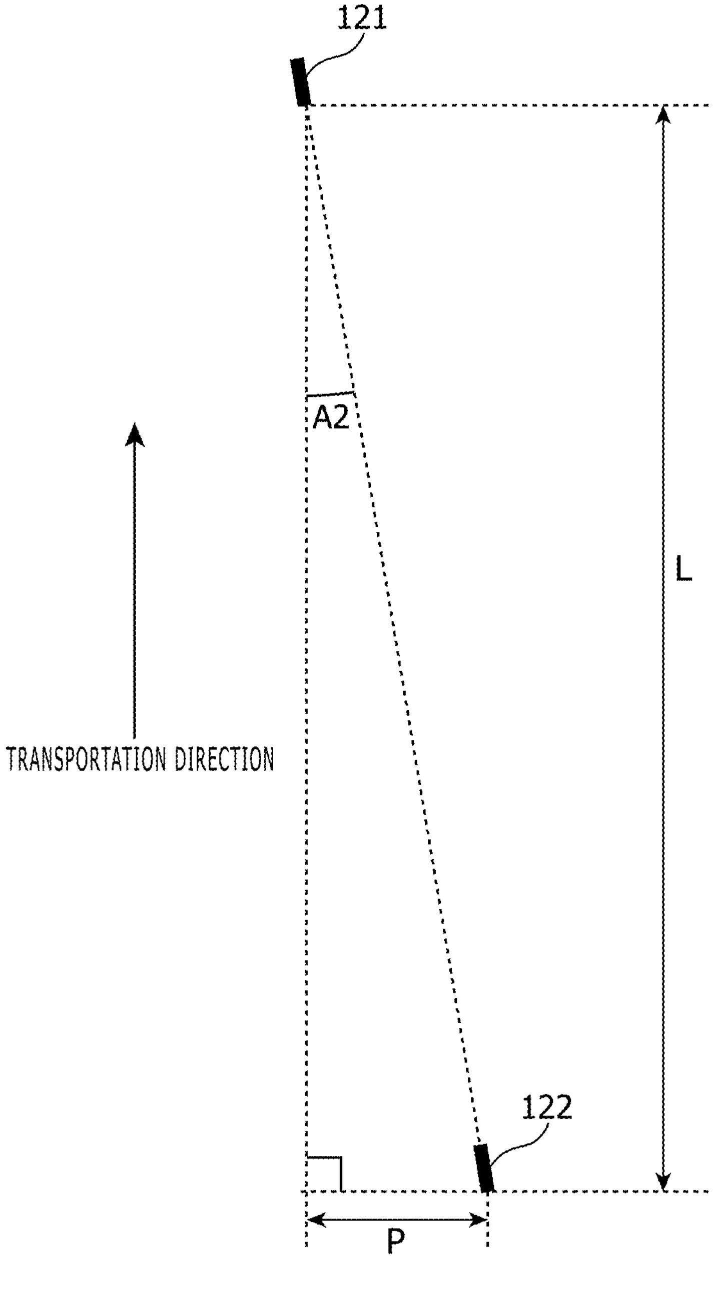
FIG. 11 shows a diagram that explains positions of two thin lines in Embodiment 1.

FIG. 10 shows a diagram that explains a density distribution of a test pattern scanned image of which the density distribution changes correspondingly to a passing position of a thin line 121 or 122. The density distribution in FIG. 10 is expressed as RGB data values, and therefore, the lower the value, the higher the density is. FIG. 11 shows a diagram that explains positions of two thin lines 121 and 122 in Embodiment 1.

As shown in FIG. 10, for example, if the thin line 121 or 122 passes through a position of the gap 51*c*, then a lower changing width appears in the density distribution than a changing width in a case that the thin line 121 or 122 passes through a position of the sensor chip 51, and therefore, if the thin line 121 or 122 passes through a position of the sensor chip 51*a* (in a case shown in FIG. 8), the thin line 121 or 122 is detected at the aforementioned secondary-scanning-directional positions in the test pattern scanned image, but if the thin line 121 or 122 passes through a position of the gap 51*c* (in a case shown in FIG. 9), the thin line 121 or 122 may not detected at the aforementioned secondary-scanning-directional positions in the test pattern scanned image.

Therefore, the print sheet is slanted with a predetermined slant angle A2 by the slant setting unit 43 such that at least one of the aforementioned thin lines 121 and 122 passes through a position other than the gap 51*c* in the line sensor 41 when a nozzle as a target of the ejection malfunction determination is not an ejection malfunction nozzle. Consequently, the line sensor 41 scans the test pattern image from the print sheet 101 slanted with the slant angle A2 and thereby generates the test pattern scanned image.

Specifically, in order for at least one of the thin lines 121 and 122 to pass through a position other than the gap 51*c* when the nozzle as a target of the ejection malfunction determination is not an ejection malfunction nozzle, as shown in FIG. 11, the aforementioned slant angle A2 (i.e. the slant angle A1) is set such that a distance P in the primary scanning direction between two positions corresponding to the aforementioned two secondary-scanning-directional positions (here, between positions of the thin lines 121 and 122) is larger than an arrangement interval of the sensor pixels 51*b* (i.e. an inverse number of a physical resolution of the sensor pixels 51*b*). Preferably, the distance P is set so as to get larger than the gap 51*c*.

Here, the distance P and the slant angle A2 have a relationship expressed as the following formula, where L is an interval between the thin lines 121 and 122 in the transportation direction.

$$P = L \times \tan(A2)$$

Therefore, the slant setting unit 43 is installed so as to get the slant angle A2 corresponding to the distance P and the interval L required for this relationship.

The following part explains a behavior of the image forming apparatus 10.

(a) Determination of an Ejection Malfunction Nozzle

Using the control unit 81, the ejection malfunction determination unit 83 causes the image outputting unit 71 to print to a print sheet 101 a test pattern image to determine an ejection malfunction nozzle.

The print sheet 101 on which the test pattern image has been printed is transported by the circulation sheet transportation unit 31, switched back by the switch back transportation path 42, and thereby it is transported to a scanning position of line the sensor 41. In this transportation, the slang setting unit 43 gives the slant angle A1 to the print sheet 101.

The line sensor 41 optically scans the test pattern image on the print sheet 101 slanted with the slant angle A1 and thereby generates a test pattern scanned image.

Subsequently, for each nozzle, the ejection malfunction determination unit 83 determines densities at at least two secondary-scanning-directional positions corresponding to the nozzle at a primary-scanning-directional position corresponding to the nozzle in the test pattern scanned image, and determines whether the nozzle is an ejection malfunction nozzle or not on the basis of the determined densities.

Further the ejection malfunction determination unit 83 stores into the storage device 73 ejection malfunction nozzle data (nozzle number or the like) that indicates the detected ejection malfunction nozzle.

As mentioned, the ejection malfunction nozzle is determined. The print sheet 101 on which the test pattern image has been printed is outputted to an output tray or the like by the sheet transportation unit 10*b*.

(b) Behavior for Printing

When receiving a print request, the control unit 81 causes the image processing unit 82 to perform an image process for an image specified by the print request, and thereby acquires image data of the image to be printed; and causes the image outputting unit 71 to transport a print sheet and print the image to be printed on the print sheet on the basis of the image data.

The control unit 81 reads the ejection malfunction nozzle data from the storage device 73 and determines an ejection malfunction nozzle before starting the printing; and upon detecting a position (a position in a perpendicular to the transportation direction) of a print sheet using the sheet sensor 2*a* or the like, (a) determines a nozzle corresponding to each pixel in the aforementioned image, (b) determines correction target nozzles used for the aforementioned image, and (c) performs the correction process for the correction target nozzles. In this correction process, for example, image data (pixel value) of a pixel corresponding to an ejection malfunction nozzle is corrected to a value of non ink ejection, and image data (pixel value) of a pixel adjacent to the ejection malfunction nozzle is corrected such that a density of this pixel is increased.

As mentioned, in Embodiment 1, there is a gap 51*c* between two adjacent sensor chips 51*a* among plural sensor chips 51*a* in the line sensor 41. The slant setting unit 43 slants a print sheet 101 after printing a test pattern image with a predetermined slant angle from the transportation direction. The line sensor 41 scans the test pattern image from the print sheet 101 slanted with the slant angle and thereby generates a test pattern scanned image. Further, the ejection malfunction determination unit 83 determines densities at at least two secondary-scanning-directional positions at a primary-scanning-directional position corresponding to each nozzle among the plural nozzles of each of the inkjet recording units 1*a* to 1*d* for each ink color in the test pattern scanned image, and determines whether the nozzle is an ejection malfunction nozzle or not on the basis of the determined densities. Here, this slant angle is set such that a distance P in the primary scanning direction between two positions in the test pattern image corresponding to the aforementioned two secondary-scanning-directional positions gets larger than the gap 51*c*.

Consequently, even if a part of a thin line formed by a nozzle that is not an ejection malfunction nozzle (in Embodiment 1, one of the two thin lines 121 and 122) passes through a position of the gap 51*c*, another part of the thin line (in Embodiment 1, the other of the two thin lines 121 and 122) passes through a position of the sensor chip 51*a*, and therefore, the ejection malfunction determination is properly performed on the basis of the densities at the two secondary-scanning-directional positions in the test pattern scanned image. Therefore, misdetection of an ejection malfunction nozzle due to the gap 51*c* is restrained.

In Embodiment 1, as shown in FIGS. 8 and 9, for example, while the sensor pixels 51*b* of the sensor chips 51*a* in the line sensor 41 have a physical resolution (e.g. 600 dpi), the aforementioned test pattern scanned image has a resolution lower than the physical resolution of sensor pixels 51*b* (e.g. 300 dpi that is a half of 600 dpi); and therefore, a large density difference appears pixel-by-pixel and influence of the gap 51*c* increases when a center pixel of the test pattern passes through a position of the gap 51*c* but the ejection malfunction determination is properly performed by determining nozzle mentioned. The an ejection malfunction as aforementioned resolution of the test pattern scanned image may be identical to the physical resolution of the sensor pixels 51*b* of the plural sensor chips 51*a* in the line sensor 41.

Embodiment 2

In Embodiment 2, instead of the first and second test pattern images 111Y to 111M and 112Y to 112M, a single test pattern image (here, the first test pattern image 111Y, 111K, 111C or 111M) is printed for each ink color, the test pattern image is scanned and thereby the test pattern scanned image is generated.

In Embodiment 2, both of the two secondary-scanning-directional positions are set in a range of a single thin line in the test pattern scanned image corresponding to the single thin line 121.

Figure 12:
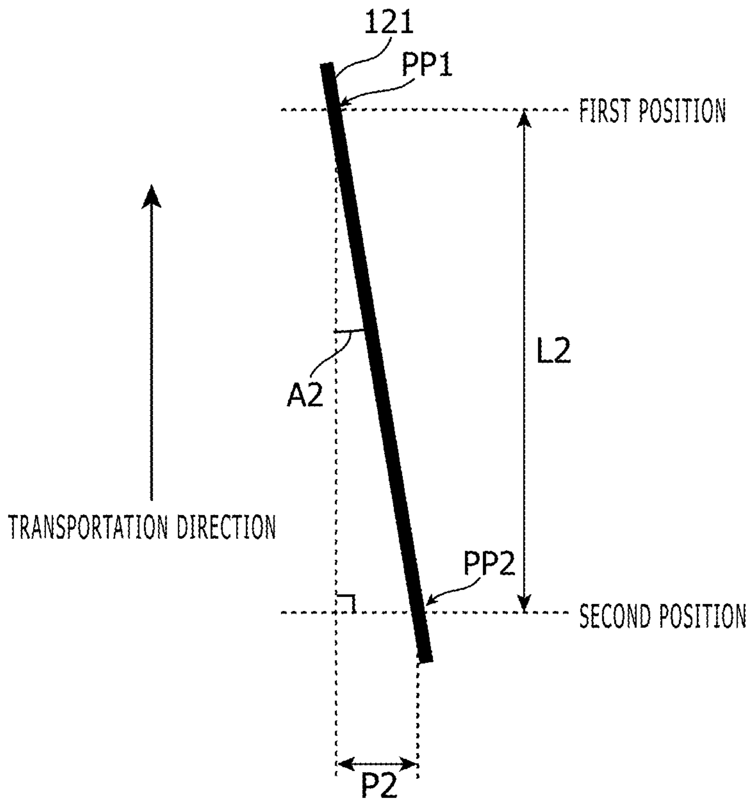
FIG. 12 shows a diagram that explains a relation between one thin line and two secondary-scanning-directional positions in Embodiment 2.

FIG. 12 shows a diagram that explains a relation between one thin line 121 and two secondary-scanning-directional positions in Embodiment 2.

If the thin line 121 on the print sheet 101 passes through a position of the gap 51*c* as mentioned, then a low changing width may appear and thereby the thin line 121 may not be detected. Therefore, in Embodiment 2, the print sheet 101 is slanted with a predetermined slant angle A2 by the slant setting unit 43 such that at least a part of the thin line 121 (a single thin line) passes through a position other than the gap 51*c* in the line sensor 41 when a nozzle that forms the thin line 121 is not an ejection malfunction nozzle. Consequently, the line sensor 41 scans the test pattern image from the print sheet 101 slanted with the slant angle A2 and thereby generates the test pattern scanned image.

A first position and a second position in a range of the thin line 121 shown in FIG. 12 in the transportation direction of the print sheet 101 correspond to the two secondary-scanning-directional positions in the test pattern scanned image, and such that at least one of the first and second positions the aforementioned part of the thin line 121 passes through a position other than the gap 51*c* in the line sensor 41, as shown in FIG. 12, the aforementioned slant angle A2 (i.e. the slant angle A1) is set such that a primary-scanning-directional distance P2 between a position PP1 of the thin line 121 at the first position and a position PP2 of the thin line 121 at the second position gets larger than an arrangement interval of the sensor pixels 51*b* (i.e. an inverse number of the physical resolution of the sensor pixels 51*b*). Preferably, the distance P2 is set so as to get larger than the gap 51*c*.

Here, the distance P2 and the slant angle A2 have a relationship expressed as the following formula, where L2 is a secondary-scanning-directional interval between the positions PP1 and PP2.

$$P2 = L2 \times \tan(A2)$$

Therefore, the slant setting unit 43 is installed so as to get the slant angle A2 corresponding to the distance P2 and the interval L2 required for this relationship.

Other parts of the configuration and behaviors of the image forming apparatus in Embodiment 2 are identical or similar to those in Embodiment 1, and therefore not explained here.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in Embodiment 1 or 2, the slant setting unit 43 may be movable and thereby may be enabled to adjust the slant angle, and may cause the print sheet 101 to be switched back in duplex printing without giving the slant angle.

Further, in Embodiment 1 or 2, the slant angle is forcibly given to the print sheet 101 by the slant setting unit 43, but alternatively, a slant angle that unintentionally occurs in transportation may be used instead of a slant angle that occurs without using the slant setting unit 43.

What is claimed is:

1. An image forming apparatus, comprising:

an inkjet recording unit configured to eject ink to a sheet using arranged plural nozzles and perform printing;

a line sensor configured to scan test pattern image on the sheet and generate a test pattern scanned image; and an ejection malfunction determination unit configured to determine whether each nozzle among the plural nozzles is an ejection malfunction nozzle or not on the basis of a density of the test pattern scanned image corresponding to this nozzle;

wherein the line sensor comprises plural sensor chips and a gap between adjacent two sensor chips among the plural sensor chips;

if the nozzle is not an ejection malfunction nozzle, a thin line along a secondary scanning direction in the test pattern image is formed by ink ejected from the nozzle;

the line sensor scans the test pattern image on the sheet slanted from a transportation direction of the sheet, and generates the test pattern scanned image;

the ejection malfunction determination unit determines densities at at least two secondary-scanning-directional positions at a primary-scanning-directional position corresponding to each nozzle among the plural nozzles in the test pattern scanned image, and determines whether the nozzle is an ejection malfunction nozzle or not on the basis of the determined densities; and a slant angle of the sheet is set such that a primary-scanning-directional distance between two positions in the test pattern image corresponding to the two secondary-scanning-directional positions is larger than an arrangement interval of sensor pixels in the sensor chip.

2. The image forming apparatus according to claim 1, wherein the test pattern image comprises a first test pattern image and a second test pattern image arranged along the secondary scanning direction, the first and the second test patterns being same as each other;

if the nozzle is not an ejection malfunction nozzle, a first thin line along the secondary scanning direction is formed in the first test pattern image by ink ejected from this nozzle, and a second thin line along the secondary scanning direction is formed in the second test pattern image by ink ejected from this nozzle;

the test pattern scanned image comprises a first test pattern scanned image corresponding to the first test pattern image and a second test pattern and a second test pattern scanned image corresponding to the second test pattern image;

one of the two secondary-scanning-directional positions is set in a range of a thin line image in the first test pattern scanned image corresponding to the first thin line;

the other of the two secondary-scanning-directional positions is set in a range of a thin line image in the second test pattern scanned image corresponding to the first thin line; and for each nozzle among the plural nozzles, the ejection malfunction determination unit determines a density at the one of the two secondary-scanning-directional positions at the primary-scanning-directional position corresponding to this nozzle and a density at the other of the two secondary-scanning-directional positions at the primary-scanning-directional position corresponding to this nozzle, and determines whether the nozzle is an ejection malfunction nozzle or not on the basis of the determined densities.

3. The image forming apparatus according to claim 1, further comprising a slant setting unit;

wherein the slant setting unit slants the sheet after printing of the test pattern image with a predetermined slant angle from the transportation direction;

the line sensor scans the test pattern image on the sheet slanted with the predetermined slant angle and generates the test pattern scanned image;

the predetermined slant angle is set such that a primary-scanning-directional distance between two positions in the test pattern image corresponding to the two secondary-scanning-directional positions is larger than an arrangement interval of sensor pixels in the sensor chip; and both of the two secondary-scanning-directional positions are set in a range of a thin line in the test pattern scanned image corresponding to the single thin line.

* * * * *